(12) United States Patent
Cruz et al.

(10) Patent No.: US 8,681,491 B1
(45) Date of Patent: Mar. 25, 2014

(54) MOBILE PHONE CASE SYSTEM

(76) Inventors: Jose L. Cruz, Meriden, CT (US); Maria E. Benito, Meriden, CT (US)

( * ) Notice: Subject to any disclaimer, the term of this patent is extended or adjusted under 35 U.S.C. 154(b) by 188 days.

(21) Appl. No.: 13/409,457

(22) Filed: Mar. 1, 2012

(51) Int. Cl.
*G06F 1/16* (2006.01)

(52) U.S. Cl.
USPC .......... 361/679.56; 455/556.1; 345/173; 248/351

(58) Field of Classification Search
USPC ......... 345/168, 170, 157, 173, 156, 166, 158, 345/633, 690, 102, 76, 204, 420, 207, 212; 361/679.01, 679.08, 679.55, 679.3, 361/679.22, 679.26, 679, 47, 679.33, 361/679.31, 679.21, 679.27, 679.54, 361/679.28; 455/573, 41.1, 556.1, 418, 455/566, 557.3, 557, 557.1, 411, 90.1, 455/550.1, 558, 347, 419, 51, 556; 347/2, 347/32, 22, 29; 248/351, 490, 476, 489, 248/201, 220.41, 460, 125.1, 176.1
See application file for complete search history.

(56) References Cited

U.S. PATENT DOCUMENTS

| | | | |
|---|---|---|---|
| 5,457,745 A * | 10/1995 | Wang | 379/454 |
| 5,537,472 A | 7/1996 | Estevez-Alcolado et al. | |
| D453,417 S | 2/2002 | Badillo et al. | |
| 7,407,257 B2 * | 8/2008 | Silverbrook et al. | 347/32 |
| 7,532,910 B2 | 5/2009 | Chen | |
| 2003/0114119 A1 | 6/2003 | Liang | |
| 2006/0287017 A1 * | 12/2006 | Wu | 455/575.7 |
| 2008/0156836 A1 | 7/2008 | Wadsworth et al. | |
| 2010/0206923 A1 | 8/2010 | McNamara et al. | |

OTHER PUBLICATIONS www.walmart.com; Body Glove Elements Snap-On Case; Internet; as of Jul. 7, 2011.

* cited by examiner

*Primary Examiner* — Hung Duong

(57) ABSTRACT

A mobile phone case system having a case divided into a first half case having a top portion and side edges and a second half case having a bottom portion and side edges, together the first half and second half case form an inner cavity adapted to hold a mobile phone, with a first stand component pivotally attached to an outer surface of the bottom portion of the second half case via a hinge component, the hinge component allows the first stand component to pivot between an extended position wherein bottom edges of the first stand component are pivoted away from the outer surface of the bottom portion of the second half case and a retracted position wherein the first stand component is flush with the outer surface of the bottom portion of the second half case.

4 Claims, 3 Drawing Sheets

BACK VIEW

Side View
in use

Sectional View

MOBILE PHONE CASE SYSTEM

FIELD OF THE INVENTION

The present invention is directed to a mobile phone case, more particularly to a case with a stand or easel for propping up the phone.

BACKGROUND OF THE INVENTION

The present invention features a novel mobile phone case system. The system of the present invention features a stand, allowing the phone to be propped up for easy viewing or gaming.

SUMMARY

The present invention features a mobile phone case system. In some embodiments, the mobile phone case system comprises a case divided into a first half case having a top portion and side edges and a second half case having a bottom portion and side edges, together the first half case and the second half case form an inner cavity adapted to hold a mobile phone; and a first stand component is pivotally attached to an outer surface of the bottom portion of the second half case via a hinge component, the hinge component allows the first stand component to pivot between an extended position wherein bottom edges of the first stand component are pivoted away from the outer surface of the bottom portion of the second half case and a retracted position wherein the first stand component is flush with the outer surface of the bottom portion of the second half case.

In some embodiments, the top portion of the first half case is open. In some embodiments, the first stand component is U-shaped. In some embodiments, the first stand component can rotate allowing for the first stand component to be oriented in a first orientation and a second orientation.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
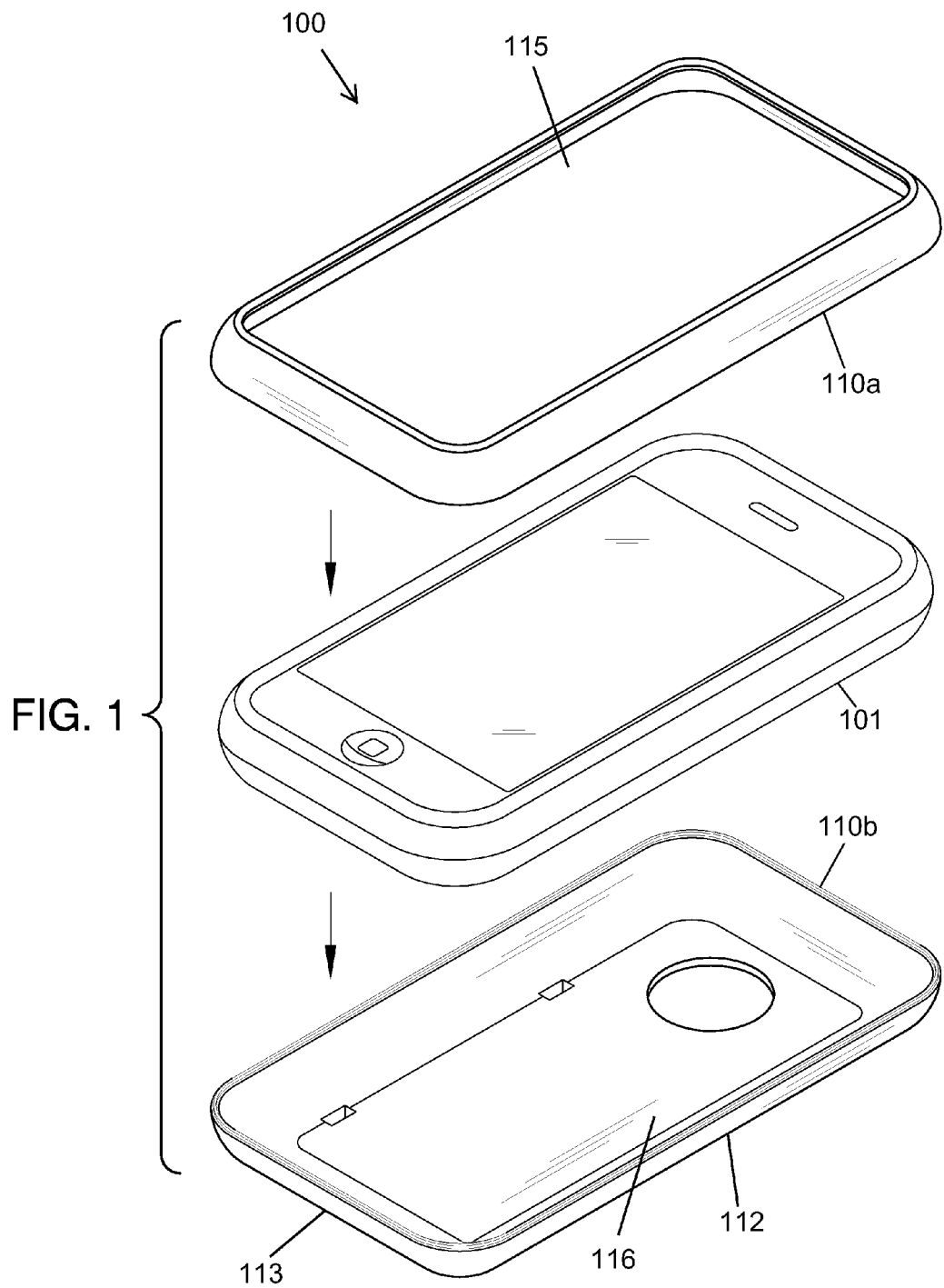
FIG. 1 is a perspective view of the mobile phone case system of the present invention.

Referring now to FIG. 1-4, the present invention features a mobile phone case system 100 for a mobile phone 101 (e.g., an iPhone®). The system 100 comprises a case 110 divided into a first half case 110a (e.g., a front half) and a second half case 110b (e.g., a back half) that together form an inner cavity adapted to hold the mobile phone 101. The first half case 110a has a top portion 115 and side edges. In some embodiments, the top portion 115 is open (e.g., a window is disposed in the top portion 115) for accessing the top surface of the mobile phone 101 (e.g., the touch screen). The second half case 110b has a bottom portion 116 and side edges. The side edges of the first half case 110a engage the side edges of the second half case 110b to secure the case 110 around the mobile phone 101.

Figure 2:
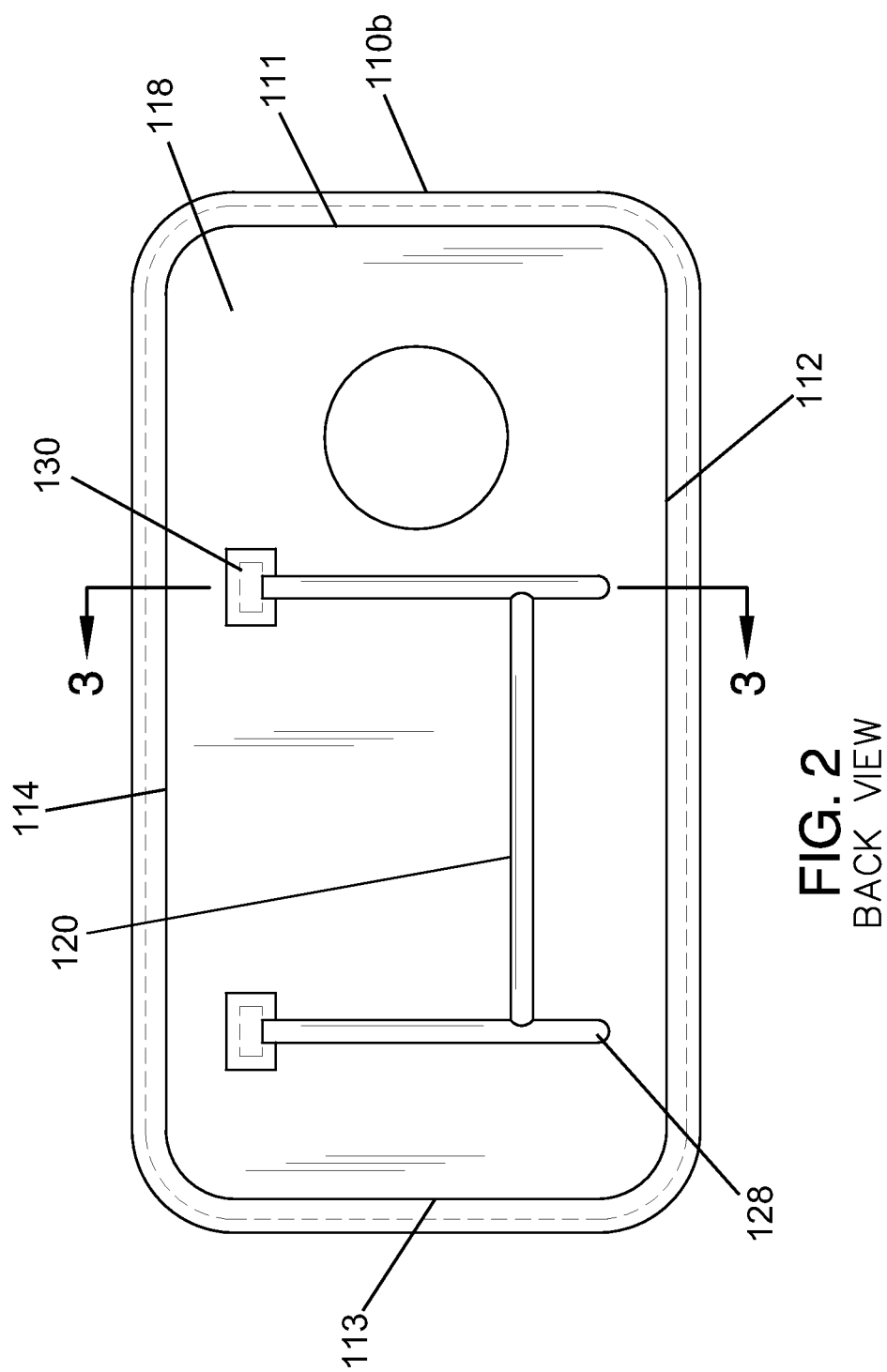
FIG. 2 is a back view of the mobile phone case system of the present invention.
Figure 4:
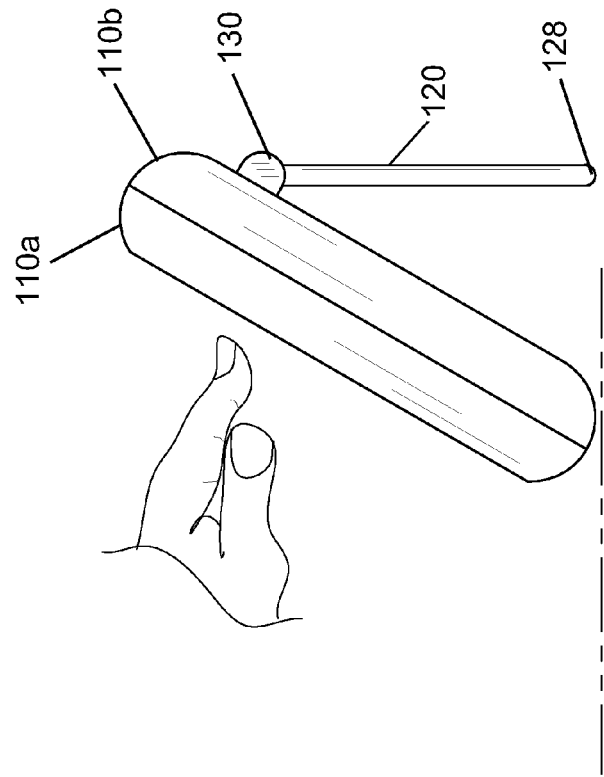
FIG. 4 is a side view of the mobile phone case system of the present invention.
Figure 3:
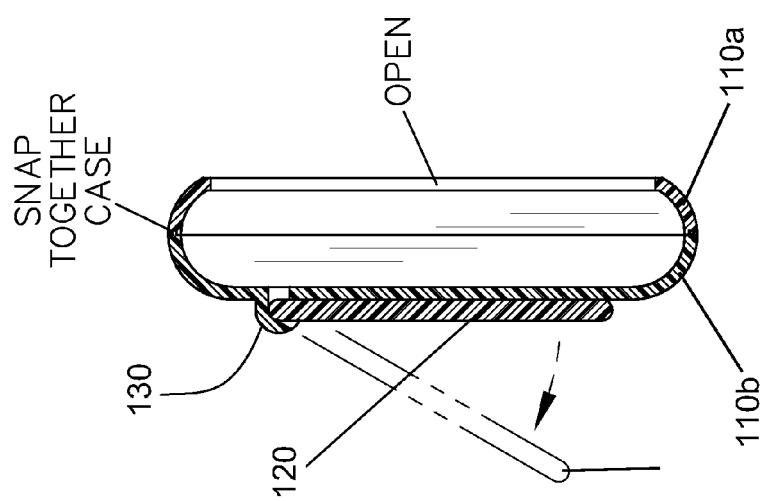
FIG. 3 is a cross-sectional view of FIG. 2 of the mobile phone case system of the present invention.

As shown in FIG. 2, a first stand component 120 is pivotally attached to the outer surface 118 of the bottom portion 116 of the second half case 110 via a hinge component 130. The hinge component 130 allows the first stand component 120 to pivot between an extended position, wherein the bottom edges 128 of the first stand component 120 are pivoted away from the outer surface 118 of the bottom portion 116 of the second half case 110 and a retracted position, wherein the first stand component 120 is flush with the outer surface 118 of the bottom portion 116 of the second half case 110. FIG. 3 shows the movement of the first stand component 120 between the extended and retracted positions.

The first stand component 120 may be attached in a variety of orientation. For example, in some embodiments, the first stand component 120 is attached in a first orientation (as shown in FIG. 2), wherein the hinge component 130 is in line with the first side edge 111 of the case 110. In some embodiments, the first stand component 120 is attached in a second orientation, wherein the hinge component 130 is in line with the second side edge 112 of the case 110. In some embodiments, the first stand component 120 is attached in a third orientation, wherein the hinge component 130 is in line with the third side edge 113 of the case 110. In some embodiments, the first stand component 120 is attached in a fourth orientation, wherein the hinge component 130 is in line with the fourth side edge 114 of the case 110.

The first stand component 120 may be constructed in a variety of shapes and sizes. For example, in some embodiments, the first stand component 120 is generally U-shaped and the two top edges of the first stand component 120 are pivotally attached to the outer surface 118 of the bottom portion 116 of the second half case 110 (e.g., see FIG. 2).

In some embodiments, the system 100 further comprises a second stand component pivotally attached to the outer surface of the bottom portion 116 of the second half case 110, wherein the second stand component is attached in an orientation that is different than the orientation of the first stand component 120. For example, in some embodiments, the first stand component 120 is attached in the first orientation and the second stand component is attached in the second orientation. In some embodiments, the first stand component 120 is attached in the first orientation and the second stand component is attached in the third orientation. In some embodiments, the first stand component 120 is attached in the first orientation and the second stand component is attached in the fourth orientation. In some embodiments, the first stand component 120 is attached in the second orientation and the second stand component is attached in the first orientation. In some embodiments, the first stand component 120 is attached in the second orientation and the second stand component is attached in the third orientation. In some embodiments, the first stand component 120 is attached in the second orientation and the second stand component is attached in the fourth orientation. In some embodiments, the first stand component 120 is attached in the third orientation and the second stand component is attached in the first orientation. In some embodiments, the first stand component 120 is attached in the third orientation and the second stand component is attached in the second orientation. In some embodiments, the first stand component 120 is attached in the third orientation and the second stand component is attached in the fourth orientation. In some embodiments, the first stand component 120 is attached in the fourth orientation and the second stand component is attached in the first orientation. In some embodiments, the first stand component 120 is attached in the fourth orientation and the second stand component is attached in the second orientation. In some embodiments, the first stand component 120 is attached in fourth third orientation and the second stand component is attached in the third orientation.

In some embodiments, the first stand component 120 can rotate, allowing for the first stand component 120 to be oriented in the first orientation and the second orientation. In some embodiments, the first stand component 120 can rotate, allowing for the first stand component 120 to be oriented in the first orientation and the third orientation. In some embodiments, the first stand component 120 can rotate, allowing for the first stand component 120 to be oriented in the first orientation and the fourth orientation. In some embodiments, the first stand component 120 can rotate, allowing for the first stand component 120 to be oriented in the second orientation and the third orientation. In some embodiments, the first stand component 120 can rotate, allowing for the first stand component 120 to be oriented in the second orientation and the fourth orientation. In some embodiments, the first stand component 120 can rotate, allowing for the first stand component 120 to be oriented in the third orientation and the fourth orientation.

Without wishing to limit the present invention to any theory or mechanism, it is believed that the present invention is advantageous be cause the stand provides support on both lateral sides.

The disclosures of the following U.S. Patents are incorporated in their entirety by reference herein: U.S. Pat. No. 5,537,472; U.S. Design Pat. No. D453,417; U.S. Pat. No. 7,532,910; U.S. Patent Application No. 2003/0114119; U.S. Patent Application No. 2008/0156836; U.S. Patent Application No. 2010/0206923.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A mobile phone case system 100 comprising:
   (a) a case 110 divided into a first half case 110a having a top portion 115 and side edges and a second half case 110b having a bottom portion 116 and side edges, together the first half case 110 and the second half case 110b form an inner cavity adapted to hold a mobile phone 101; and
   (b) a first stand component 120 is pivotally attached to an outer surface 118 of the bottom portion 116 of the second half case 110 via a hinge component 130, the hinge component 130 allows the first stand component 120 to pivot between an extended position wherein bottom edges 128 of the first stand component 120 are pivoted away from the outer surface 118 of the bottom portion 116 of the second half case 110 and a retracted position wherein the first stand component 120 is flush with the outer surface 118 of the bottom portion 116 of the second half case 110.

2. The system 100 of claim 1, wherein the top portion 115 of the first half case 110a is open.

3. The system 100 of claim 1, wherein the first stand component 120 is U-shaped.

4. The system 100 of claim 1, wherein the first stand component 120 can rotate allowing for the first stand component 120 to be oriented in a first orientation and a second orientation.

* * * * *